United States Patent
Stemmer

(10) Patent No.: US 9,486,857 B2
(45) Date of Patent: Nov. 8, 2016

(54) FINISH-PRESSED/FINAL-SINTERED BLANKING DIE AND METHOD FOR PRODUCING SAME

(75) Inventor: Uwe Stemmer, Nürtingen (DE)

(73) Assignee: CeramTec GmbH, Plochingen (DE)

( * ) Notice: Subject to any disclaimer, the term of this patent is extended or adjusted under 35 U.S.C. 154(b) by 771 days.

(21) Appl. No.: 13/990,086

(22) PCT Filed: Dec. 1, 2011

(86) PCT No.: PCT/EP2011/071457
§ 371 (c)(1),
(2), (4) Date: Aug. 1, 2013

(87) PCT Pub. No.: WO2012/072721
PCT Pub. Date: Jun. 7, 2012

(65) Prior Publication Data
US 2013/0251467 A1  Sep. 26, 2013

(30) Foreign Application Priority Data
Dec. 1, 2010  (DE) ......................... 10 2010 062 259

(51) Int. Cl.
B23B 27/00 (2006.01)
B23B 27/14 (2006.01)
(Continued)

(52) U.S. Cl.
CPC ........... B23B 27/148 (2013.01); B23B 27/141 (2013.01); B23P 15/28 (2013.01);
(Continued)

(58) Field of Classification Search
CPC .... B23B 27/143; B23B 27/148; B23B 27/14
See application file for complete search history.

(56) References Cited

U.S. PATENT DOCUMENTS 4,963,061 A * 10/1990 Katbi ................... B23B 27/143
407/113
5,024,976 A * 6/1991 Mehrotra .............. B23B 27/148
407/119
(Continued)

FOREIGN PATENT DOCUMENTS

DE  200 00 738 U1  3/2000
WO  03/013770 A1  2/2003
(Continued)

*Primary Examiner* — Will Fridie, Jr.
(74) *Attorney, Agent, or Firm* — Norton Rose Fulbright US LLP

(57) ABSTRACT

The invention relates to a ready-to-use ceramic blanking die (1), which is produced by sintering a blank, as an indexable insert, comprising an upper face and a lower face (2, 3) which each have a support surface (4) for installation in a tool holder of a cutting tool, lateral surfaces (5) that connect the upper and lower faces (2, 3), and cutting edges (6) for machining workpieces. In order to least partly avoid a finishing machining step after sintering at, utilize the advantages of the finish-pressed/final-sintered contact surfaces between the blanking die and the tool and assure optimal contact of the blanking die to prevent vibrations and the attendant micro-chipping/wear, a peripheral face (7) is arranged adjacent to the cutting edges (6) and the face (7) circumscribes the support surface (4), wherein the lateral surfaces (5), the cutting edges (6) and the faces (7) consist of the sinter skin created during sintering and have not been damaged by a material-removing machining process, and only the support surface (4) underwent a material-removing machine process and does not consist of the sinter skin created during sintering.

15 Claims, 1 Drawing Sheet

(51) Int. Cl.
*B23P 15/28* (2006.01)
*C04B 35/117* (2006.01)
*C04B 35/119* (2006.01)
*C04B 35/584* (2006.01)
*C04B 35/597* (2006.01)
*C04B 35/64* (2006.01)

(52) U.S. Cl.
CPC .......... *C04B 35/117* (2013.01); *C04B 35/119* (2013.01); *C04B 35/584* (2013.01); *C04B 35/597* (2013.01); *C04B 35/64* (2013.01); *B23B 2226/18* (2013.01); *C04B 2235/3856* (2013.01); *C04B 2235/3886* (2013.01); *C04B 2235/608* (2013.01); *C04B 2235/767* (2013.01); *C04B 2235/94* (2013.01); *Y10T 29/4998* (2015.01); *Y10T 407/23* (2015.01)

(56) References Cited

U.S. PATENT DOCUMENTS

| | | | | |
|---|---|---|---|---|
| 5,116,167 | A | * | 5/1992 | Niebauer .............. B23B 27/143 407/114 |
| 5,122,017 | A | * | 6/1992 | Niebauer .............. B23B 27/143 407/114 |
| 5,296,008 | A | | 3/1994 | Moriguchi et al. |
| 5,330,296 | A | * | 7/1994 | Beeghly ............... B23B 27/143 407/114 |
| 7,073,986 | B2 | | 7/2006 | Andras |
| 7,320,563 | B2 | | 1/2008 | Mueller et al. |
| 7,837,417 | B2 | * | 11/2010 | Blomstedt ............ B23B 27/145 407/113 |
| 8,388,273 | B2 | | 3/2013 | Eder et al. |
| 2003/0086766 | A1 | | 5/2003 | Andras |
| 2004/0256608 | A1 | | 12/2004 | Eder et al. |
| 2009/0035521 | A1 | | 2/2009 | Hafner et al. |
| 2012/0195702 | A1 | | 8/2012 | Eder et al. |
| 2013/0251467 | A1 | * | 9/2013 | Stemmer ............... B23B 27/141 407/113 |

FOREIGN PATENT DOCUMENTS

| | | |
|---|---|---|
| WO | 2004/024379 A1 | 3/2004 |
| WO | 2005/021192 A1 | 3/2005 |
| WO | 2007/075140 A1 | 7/2007 |

\* cited by examiner

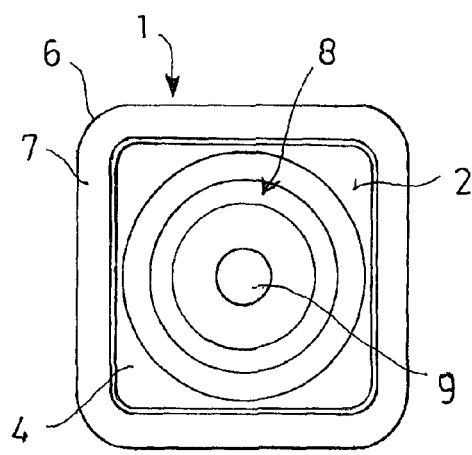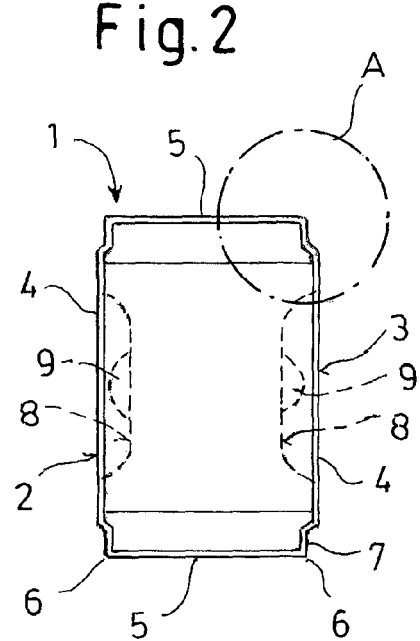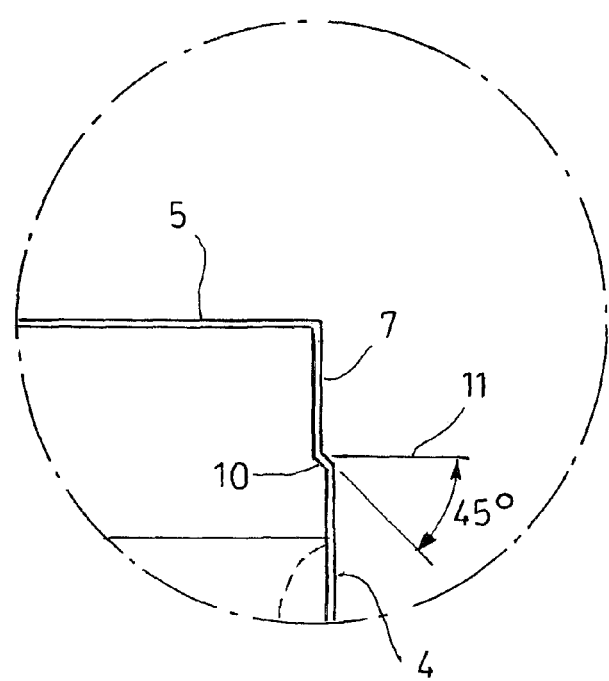

FINISH-PRESSED/FINAL-SINTERED BLANKING DIE AND METHOD FOR PRODUCING SAME

This application is a §371 of International Application No. PCT/EP2011/071457 filed Dec. 1, 2011, and claims priority from German Patent Application No. 10 2010 062 259.1 filed Dec. 1, 2010.

The invention relates to a ready-to-use ceramic blanking die produced by sintering a blank, as an indexable insert, having an upper face and a lower face, each face having a support surface for installation in a tool holder of a cutting tool, having lateral surfaces connecting the upper face and the lower face and having cutting edges for machining workpieces.

According to the prior art, the narrow tolerances for a ceramic blanking die (e.g., for the G-tolerance in the diameter of the inscribed circle±25 μm at d=12.7 mm and with the thickness s=±130 μm) are adjusted using diamond tools by regrinding after sintering, i.e., in the condition in which the material has already formed all of its excellent properties. In addition to the angles, radii and cutting edge preparation of the indexable inserts, a secure seating of the indexable insert in the plate seating is important. This makes corresponding demands of the planarity of the support surface of the indexable inserts. This requirement is achieved by planning with diamond tools. This post-processing is always associated with high grinding forces and pressures which result in damage to the material.

The object of the present invention is to improve upon a ready-to-use blanking die according to the preamble of claim 1, so that post-processing after sintering can be avoided in at least some cases. Furthermore, the advantages of the finish-pressed/final-sintered contact faces between the blanking die and the workpiece should be utilized. Furthermore, optimal contact of the blanking die should be ensured, so that vibrations and the associated micro chipping and wear are prevented.

The present invention is described in greater detail below on the basis of the claims and the figures.

Post-processing of these surfaces after sintering is prevented due to the fact that a peripheral face is arranged adjacent to the cutting edges, and the working face borders the support surface, such that the lateral surfaces, the cutting edges and the working face consist of the sinter skin formed during sintering and has not been damaged by the removal of material in machining, and only the support surfaces have been subjected to a material-removing machining and do not consist of the sinter skin formed in sintering. Since the sinter skin is often harder than the base material, the wear resistance of the cutting substance and/or of the blanking die is thereby increased and the lifetime is prolonged.

The blanking die preferably conforms to a dimensional accuracy in accordance with the M-tolerance of ISO1382 or a dimensional accuracy in accordance with the G-tolerance of ISO1382. Due to these narrow tolerances, the dimensional accuracy requirement is met and errors due to deviations from tolerance are prevented.

For fastening the blanking die, the support surface preferably has a clamping recess. This is preferably designed to be circular with a hill-shaped or circular elevation at the center, such that the elevation is above the bottom of the recess and the highest point of the elevation is below the support surface.

The blanking die preferably consists of one or more of the ceramic cutting materials listed below:

α-/β-SiAlONe with and without reinforcement with hard material
β-$Si_3N_4$ with and without hard material
Mixed ceramic ($Al_2O_3$—Ti(C, N))
Zirconia-toughened alumina, ZTA ($Al_2O_3$—$ZrO_2$)

A method according to the invention for manufacturing a ceramic blanking die by sintering a blank is described, wherein said blanking die has an upper face and a lower face, each having a support surface for installation in a tool holder of a blanking die, lateral surfaces connecting the upper face and the lower face and having cutting edges for machining workpieces, for producing the blanking die described above. This method is characterized in that a peripheral face is arranged adjacent to the cutting edges, said peripheral face bordering the support surface, the blank of the blanking die being brought to the desired shape by precision pressing before sintering, and then the blank being sintered and only the support surface being subjected to a material-removing treatment after sintering.

The support surfaces are preferably formed with an elevation with respect to the machined faces before sintering so that the support surfaces can be ground or polished or lapped after sintering without damaging the machined surface and the cutting edges. The material-removing treatment of the support surface after sintering has the advantage that the blanking die can sit optimally in the holder and therefore vibrations and the associated micro chipping and wear associated can be prevented.

The support surface is preferably designed to be elevated by less than 2 mm, preferably between 0.8 mm and 1.2 mm with respect to the machined faces.

A clamping recess is preferably pressed into the upper face and/or the lower face by the precision pressing of the blank.

In an advantageous embodiment, one or more of the ceramic cutting materials listed below is used to produce the blank:

α-/β-SiAlONe with and without reinforcement with hard material
β-$Si_3N_4$ with and without hard material
Mixed ceramic ($Al_2O_3$—Ti(C, N))
Zirconia-toughened alumina, ZTA ($Al_2O_3$—$ZrO_2$)

The ceramic cutting materials are preferably mixed to form a pressable composition which has a good pourability and therefore in particular has a constant mold filling property, so that the angle of repose, which characterizes the pour ability, of the composition is ≤35°, preferably ≤30°, especially preferably ≤25°. The tolerance is adjusted through the aforementioned adjustment of pourability and the associated mold filling capacity.

Before sintering, the press flashes on the blank are advantageously removed without damaging the edges of the blank.

The different pressing and shrinkage properties of different batches of the composition are preferably taken into account by determining the green density shrinkage characteristic of each batch through pressing and sintering tests and by defining the required green density during production from these results and then adjusting this finishing green density when setting the pressing at an ideal value for the green density of the blanks. This is an important step in the required precision pressing.

During sintering, the gas exchange between the furnace atmosphere and the interior of the crucible in which the blanks are sintered is preferably minimized, and only crucible materials that are inert are used, i.e., materials that in no way interact with the blanks during sintering. Therefore there are no impurities.

A blanking die according to the invention thus preferably satisfies the dimensional accuracy according to the M-tolerance of ISO1382 and/or the dimensional accuracy according to the G-tolerance of ISO1382.

The blanking die is preferably an indexable insert.

The blanking die according to the invention is preferably used for cutting metals, nonferrous metals, plastics, wood or composite materials.

According to the invention, in manufacturing indexable inserts from materials of high performance ceramics by precision pressing and direct sintering, the dimensions are achieved while remaining in compliance with the M and G tolerances according to ISO1382.

The step according to the invention consists of, among other things, bringing the blank of the blanking die for sintering to such a shape by precise pressing (here also referred to as precision pressing) bringing it to a shape which will make it possible that polishing or lapping of the finished sintered blanking die is no longer necessary after sintering on the lateral surfaces and the working faces.

The invention achieves the following improvements in use:
  Damage to the ceramic due to grinding or lapping occurs only on the support surface, i.e., there is little susceptibility of the blanking dies during use with respect to chipping and crumbling.
  The "sinter skin" is preserved. Since the sinter skin also has a greater hardness than the base material, the wear resistance of the cutting material is further increased, which is manifested in practice in cutting due to lower wear on open surfaces and notches.
  Due to the low overall wear on the indexable insert, chipping of the component can also be reduced due to the resulting lower cutting forces.
  It is also advantageous that the machined faces act as a chip breaker to deflect cutting.
  A reduction in the noise produced during use of the indexable insert according to the invention is also advantageous.

The present invention is based on the following inventive accomplishments, and it would be advantageous to take into account the following features alone or in combination in production:
  In pressing a blank, a very accurate and precise sintered gap is advantageously to be adjusted between press stamps and dies. This may then be implemented in particular by a quick clamping system.
  The pressing sequence is preferably extremely accurate and is adjusted with a high reproducibility.
  The pressable composition, preferably with a very high pourability and therefore a constant mold filling capacity. The pourability is characterized by the so-called angle of repose. For this measurement, a defined amount of press granules is poured uniformly into a transparent container. Then the bottom plate is opened slightly, so that some of the powder runs out. Depending on the pourability of the granules, the powder remaining in the container forms a more or less steep edge, and its angle is measured as the angle of repose. The angle of repose should be $\leq 35°$ for good pourability, preferably $\leq 30°$, especially preferably $\leq 25°$.
  A high constancy in the green density of all blanks is necessary. This is achieved by a composition having a very good pourability and a very precisely controlling press. With automatic measurement of weight and height downstream from the press, the green density of each press part can be calculated. The scattering in the green density from one blank to the next should be $\leq 0.5\%$, preferably $\leq 0.3\%$ of the average (for example, see FIG. 1: finishing green density 1.956 g/cm$^3$, green densities are within 1.951-1.963 g/cm$^3$; ideal at max. 0.3% deviation 1.951-1.962 g/cm$^3$).
  Removing the press flashes from the blank without damaging the edges of the blank. Because of the gap between the press rams and the die, a thin flash remains on the blank. This must be removed before sintering, so that it cannot start to sinter and later lead to chipping of the edge.
  Taking into account the different pressing and shrinkage behaviors of different batches of the composition. The green density shrinkage characteristic of each batch is determined here by pressing and sintering tests, and the required finishing green density is defined on that basis. This finishing green density is used as the ideal value for the green density of the blanks in setting the presses.
  A special furnace structure to prevent deformation during sintering as well as preventing gradients in density, shrinkage and color. In particular the gas exchange between the furnace atmosphere and the crucible interior must be minimized. In addition, only crucible materials that are inert, i.e., in no way interact with the blank during sintering, may be used. These measures are necessary to achieve homogeneous shrinkage of the blanks during sintering. However, if there are any interactions of the blanks with the furnace atmosphere or the crucible material, the shrinkage of the blanks will be influenced locally, so that deformation does occur during sintering and the dimensional accuracy can no longer be ensured. If sintering deformation occurs, then mainly corners and edges of the parts set on edge are affected. For example, in the case of silicone nitride or SiAlON materials, a high concentration of carbon in the gas atmosphere, e.g., due to new graphite materials in the crucible or the furnace insulation will lead to a reduction in the sintering additives at the surface, which are absolutely essential for compaction. The shrinkage at the edge of a component will therefore be less than at the center of the component, so this results in deformation of the sintered component.

For better clamping of the blanking die, a recess such as that described in WO 03/013770 A1 is preferably created in the blanking dies. This recess has a spherical or circular elevation at the center. The tip of the elevation is above the bottom of the recess and beneath the upper face of the blanking die. For clamping on a cutting tool, the clamping jaw with a fitted shaped nose engages in a form-fitting manner in the recess of the blanking die. This recess serves to provide a form-fitting tension on the carrier body. This blanking die with the special recess is recommended in particular for drawing cuts, in which the blanking die is to be pulled out of its seating by the cutting forces acting on it. See the document referenced above for a further description of this recess.

In another embodiment according to the invention, the recess is designed as described in EP 1 536 903 B1, so that constant installation conditions will always be obtained. In this case a first clamping recess is created in the cutting tool for clamping purposes, and a second clamping recess is arranged coaxially with the first clamping recess, such that the first clamping recess is situated at a lower level than the second clamping recess and both of them are lower than the upper face of the blanking die. In clamping this blanking die in a tool, there is a clamping jaw of the tool resting on the second clamping recess and engaging with a nose in the first clamping recess, for example. The distance from the support surface of the clamping jaw to the recess is thus always constant.

FIG. 1 shows a blanking die according to the invention in a view from above.

FIG. 2 shows a section and

FIG. 3 shows detail A of FIG. 2 on an enlarged scale.

The example here shows a square blanking die 1 designed as an indexable insert. The blanking die has an upper face 2, a lower face 3 and a lateral surface 5 connecting the upper face 2 to the lower face 3. A peripheral working face 7 having a depth of 1 mm is arranged adjacent to the cutting edges 6. The lateral surfaces 5 and the working face 7 were not subjected to any material-removing machining after being sintered, so they have an undamaged sinter skin. Inside the peripheral working face 7, there is a support surface 4 with which the blanking die 1 sits in a cutting tool. The support surface 4 is elevated with respect to the working face 7. In the embodiment described here, the difference in height of the support surface 4 and the working face 7 is between 0.05 and 0.1 mm. The working face 7 develops into the support surface 4 by way of a slope 10. The slope 10 runs at an angle of 45° to the surface normal 11 of the working face 7.

The support surface 4 is provided with a clamping recess 8, where the clamping recess 8 is designed with a circular shape and has a spherical or circular elevation 9 at the center, the elevation 9 being situated above the bottom of the recess and beneath the support surface 4. An engaging element of a tool mount with a circular ring preferably engages in the circular clamping recess and thereby extends around the elevation 9 for fastening purposes.

The invention claimed is:

1. A ready-to-use ceramic blanking die as an indexable insert prepared by the process of:
    sintering a blank to form a sinter skin, wherein the blank comprises:
        an upper face;
        a lower face; wherein each of said upper and lower faces have a support surface for installation in a tool holder of a cutting tool;
        lateral surfaces which connect the upper face and lower face, the lateral surfaces having cutting edges for machining of workpieces by cutting;
        arranging a peripheral working face adjacent to the cutting edges, wherein the working face borders the support surface such that the lateral surfaces, the cutting edges and the working face comprise the sinter skin, wherein the sinter skin has not been damaged during a material-removing machining;
    wherein only the support surfaces are subjected to a material-removing machining and do not consist of the sinter skin, and
    wherein the blanking die conforms to a dimensional accuracy according to the M tolerance of ISO1382 or the blanking die conforms to a dimensional accuracy according to the G tolerance of ISO1382.

2. The blanking die according to claim 1, wherein the support surfaces have a clamping recess.

3. The blanking die according to claim 2, wherein the clamping recesses have a spherical or circular elevation at the center thereof and the elevation is situated above the bottom of the recess, and wherein the elevation has a highest point situated below the support surface.

4. The blanking die according to claim 1, wherein the blanking die comprises a ceramic cutting material selected from the group consisting of α-SiAlONe, β-SiAlONe, β-$Si_3N_4$, a mixed ceramic and zirconia-toughened alumina.

5. A method for manufacturing a ceramic blanking die according to claim 1 comprising the steps of
    sintering a blank to form a sinter skin, wherein the blank comprises:
        an upper face;
        a lower face; wherein each of said upper and lower faces have a support surface for installation in a tool holder of a cutting tool;
        lateral surfaces which connect the upper face and lower face, the lateral surfaces having cutting edges for machining of workpieces by cutting; and
        arranging a peripheral working face adjacent to the cutting edges, wherein the working face borders the support surface such that the lateral surfaces;
        wherein the cutting edges and the working face comprise the sinter skin, wherein the sinter skin has not been damaged during a material-removing machining; and
        subjecting the support surfaces to a material-removing machining step, wherein the blanking die conforms to a dimensional accuracy according to the M tolerance of ISO1382 or the blanking die conforms to a dimensional accuracy according to the G tolerance of ISO1382.

6. The blanking die according to claim 5, wherein the support surfaces have a clamping recess.

7. The blanking die according to claim 6, wherein the clamping recesses have a spherical or circular elevation at the center thereof and the elevation is situated above the bottom of the recess, and wherein the elevation has a highest point situated below the support surface.

8. The blanking die according to claim 1, wherein the blanking die comprises a ceramic cutting material selected from the group consisting of α-SiAlONe, β-SiAlONe, β-$Si_3N_4$, a mixed ceramic and zirconia-toughened alumina.

9. A method for manufacturing a ceramic blanking die according to claim 1, comprising the steps of
    preparing a blank and having an upper face and a lower face, each having a support surface, for installation in a tool holder of a cutting tool, having lateral surfaces connecting the upper and lower faces and having cutting edges for machining of workpieces by cutting, for manufacturing a blanking die, wherein a peripheral working face is arranged adjacent to the cutting edges and the working face borders the support surface,
    bringing the blank of the blanking die is brought to the desired shape by precision pressing before sintering, and
    sintering the blank; and
    subsequently subjecting only the support surfaces to a material-removing treatment,
    wherein the support surface are designed to be elevated with respect to the working faces before sintering;
    wherein the blank comprises a cutting material selected from the group consisting of α-SiAlONe, β-SiAlONe, β-Si3N4, a mixed ceramic and zirconia-toughened alumina; and
    wherein the ceramic cutting materials are mixed to form a pressable composition which has a high pourability and a constant mold filling capacity, such that the angle of repose characterizing the pour ability of the composition is to be set at ≤35°.

10. The method according to claim 9, wherein the support surface is designed to be elevated by less than 2 mm with respect to the working faces.

11. The method according to claim 10, further comprising the step of pressing a clamping recess into the support surface of the upper face/or the lower face.

12. The method according to claim 9, wherein the blank comprises said α-zirconia-toughened alumina.

13. A method for manufacturing a ceramic blanking die according to claim 1, comprising the steps of
preparing a blank and having an upper face and a lower face, each having a support surface, for installation in a tool holder of a cutting tool, having lateral surfaces connecting the upper and lower faces and having cutting edges for machining of workpieces by cutting, for manufacturing a blanking die, wherein a peripheral working face is arranged adjacent to the cutting edges and the working face borders the support surface,
bringing the blank of the blanking die is brought to the desired shape by precision pressing before sintering, and
sintering the blank; and
subsequently subjecting only the support surfaces to a material-removing treatment,
wherein the support surface are designed to be elevated with respect to the working faces before sintering;
wherein the blank comprises a cutting material selected from the group consisting of α-SiAlONe, β-SiAlONe, β-Si3N4, a mixed ceramic and zirconia-toughened alumina, and
wherein before sintering press flashes on the blank are removed without damaging the edges of the blank.

14. The method according to claim 10, wherein the different pressing and shrinkage properties of different batches of the composition are taken into account such that the green density shrinkage characteristic of each batch is determined by pressing and sintering tests and the required finishing green density is defined based on these results and this finishing green density is set as the ideal value for the green density of the blanks in setting the presses.

15. The method according to claim 10, wherein a gas exchange between the furnace atmosphere and a crucible interior in which the blanks are sintered is minimized during sintering and only crucible materials that are inert with respect to the blanks are provided.

* * * * *